United States Patent [19]

Petermann

[11] Patent Number: 5,160,814
[45] Date of Patent: Nov. 3, 1992

[54] HYDRAULICALLY-ACTUATED DOWNHOLE SEISMIC SOURCE

[75] Inventor: Steven G. Petermann, Plano, Tex.

[73] Assignee: Atlantic Richfield Company, Los Angeles, Calif.

[21] Appl. No.: 554,620

[22] Filed: Jul. 18, 1990

[51] Int. Cl.$^5$ .............................................. G01V 1/40
[52] U.S. Cl. ................................. 181/106; 181/113; 181/119; 367/75
[58] Field of Search ............... 181/106, 113, 119, 121; 367/75; 73/151

[56] References Cited

U.S. PATENT DOCUMENTS

| | | | |
|---|---|---|---|
| 3,221,833 | 12/1965 | Malmberg | 181/106 |
| 3,282,371 | 11/1966 | Miller | 181/106 |
| 4,699,240 | 10/1987 | Dedole | 181/106 |
| 4,702,343 | 10/1987 | Paulsson | 181/106 |
| 4,805,725 | 2/1989 | Paulsson | 181/106 |
| 5,018,598 | 5/1991 | Sodich | 181/106 |
| 5,031,717 | 7/1991 | Hardee et al. | 181/106 |

Primary Examiner—J. Woodrow Eldred
Attorney, Agent, or Firm—Michael E. Martin

[57] ABSTRACT

Seismic signals are generated in an earth formation at a selected point in a wellbore by apparatus insertable in the wellbore at the distal end of a tubing string. The apparatus is adapted to receive hydraulic pressure fluid from the tubing string for deploying contactor pads in engagement with the wellbore wall and for transmitting seismic signals through the pads to the earth formation. In one embodiment a hydraulic piston is directly connected to linkage for the contactor pads and an oscillatory signal is imposed on the piston for generating vibratory seismic signals. In a second embodiment, a compressed gas-driven impactor is moved to and held in a cocked position by a hydraulically-actuated setting and latching mechanism. Hydraulic control valves and electrical operating circuits are disposed on the apparatus and may be controlled from the surface by way of a wireline cable extending through the tubing string.

5 Claims, 10 Drawing Sheets

HYDRAULICALLY-ACTUATED DOWNHOLE SEISMIC SOURCE

BACKGROUND OF THE INVENTION

1. Field of the Invention

The present invention pertains to hydraulically-actuated and electrically-controlled downhole vibratory/impact source apparatus for generating seismic signals in conjunction with vertical seismic profiling-type logging or exploration processes.

2. Background

Certain well "logging" and hydrocarbon exploration processes are performed utilizing what are known as vertical seismic profiling or reverse vertical seismic profiling processes. In reverse vertical seismic profiling processes, a source of an impact signal is lowered into a wellbore to generate vibrations which are transmitted through the earth formation to an array of geophones located in either adjacent wellbores and/or on the earth's surface in a predetermined pattern. This process is useful in obtaining information about particular formation zones of interest surrounding the wellbore.

One constraint on providing suitable vertical seismic profiling processes is the limitations on providing suitable power sources downhole to generate repeated impact or vibratory signals to the earth formation which will provide suitable readings at the receiver elements or geophones. Since it is usually undesirable to damage the wellbore in which the source is disposed, explosive-type seismic sources are, in many instances, not usable. Moreover, heretofore, it has been impractical to transmit or generate enough electrical power "downhole" to provide adequate energy for a seismic source. However, with the development of combinations of tubing strings, notably coiled tubing, with electrical cable or so-called wireline-type electrical conductor arrangements for performing certain operations in a wellbore, it has been determined that it is possible to provide adequate hydraulic power through the tubing string to a downhole vibratory source as established by the embodiments of the present invention.

SUMMARY OF THE INVENTION

The present invention provides a unique downhole vibratory/impact source for generating seismic signals which may be transmitted through an earth formation for exploratory and/or formation logging-type processes. In accordance with an important aspect of the present invention, there are provided embodiments of a downhole seismic source apparatus which may be conveyed into a wellbore on the distal end of an elongated tubing string, which tubing string provides for the conduction of hydraulic fluid to the apparatus to deploy a seismic source mechanism in the wellbore and to generate seismic signals for transmission through the earth.

In one embodiment of the present invention, a downhole, hydraulically-actuated seismic source apparatus is provided wherein an impactor mechanism is deployed into contact with the wellbore wall and the mechanism in contact with the wall is vibrated with sufficient intensity to generate seismic signals for transmission through the earth formation. The apparatus is advantageously adapted for deployment into and retrieval from the wellbore at the distal end of a coiled tubing string and through which an electrical control cable is extended for operating certain control elements associated with the seismic signal generator.

Further in accordance with the present invention, variable frequency and/or variable amplitude vibratory signals are generated by a hydraulic actuator. In an alternate embodiment of the present invention, a pneumo-hydraulic actuator or impactor which is disposed in the wellbore and operated by hydraulic fluid transmitted through the tubing string.

Those skilled in the art will recognize the advantages and superior features of the respective embodiments of the present invention upon reading the detailed description which follows in conjunction with the drawing.

DESCRIPTION OF PREFERRED EMBODIMENTS

Figure 1:
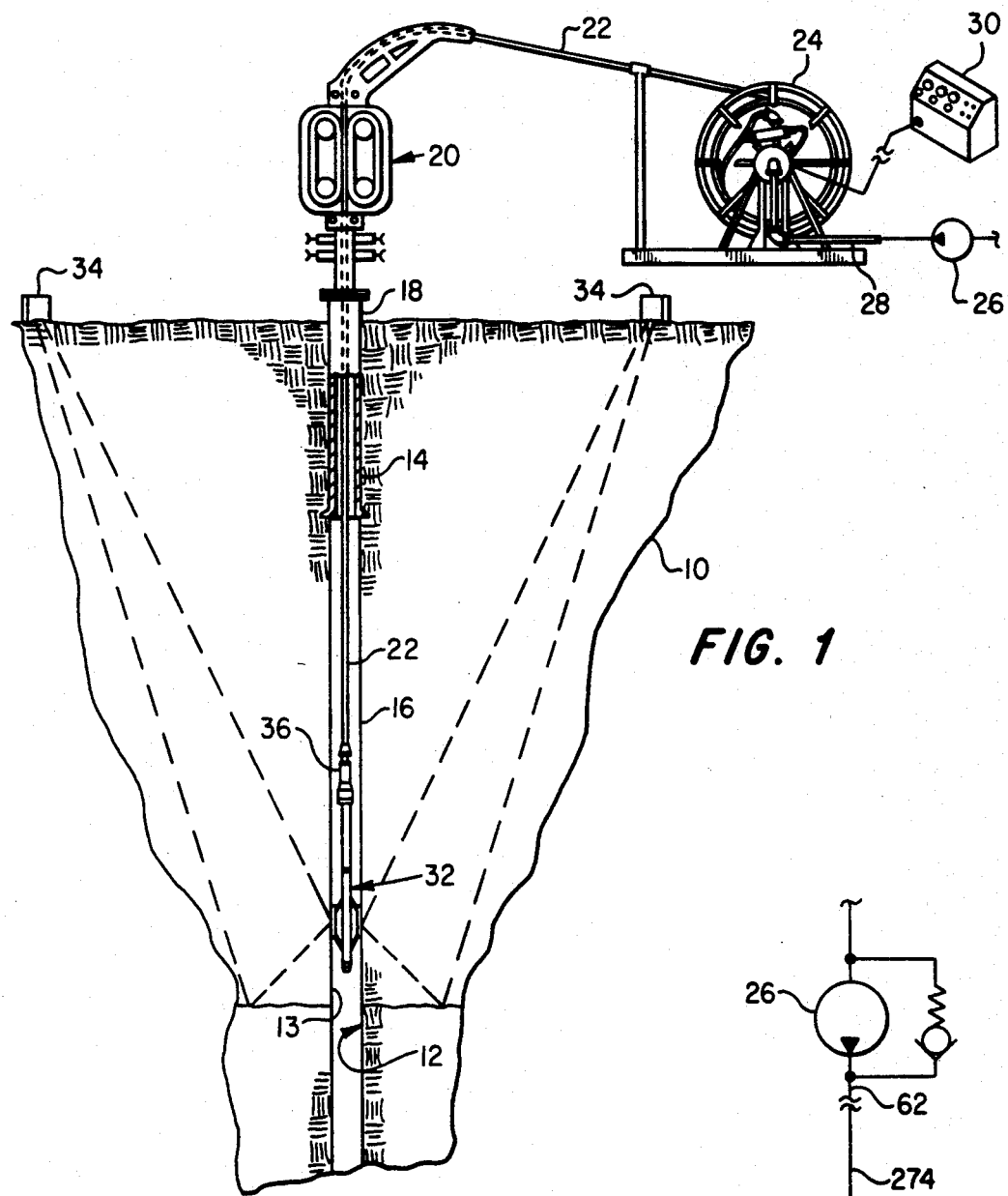
FIG. 1 is a vertical section view of a wellbore into which the seismic signal generating apparatus of the present invention has been deployed on a coiled tubing string.

In the description which follows, like parts are marked throughout the specification and drawing with the same reference numerals, respectively. The drawing figures are not necessarily to scale and certain elements are shown in generalized or somewhat schematic form in the interest of clarity and conciseness. FIGS. 2A through 2D and 4A through 4E are intended to be viewed as one continuous figure, respectively, when aligned with each other along the lines bearing the same lower case letters.

Referring to FIG. 1, there is illustrated a view of earth formation 10 into which a wellbore 12 has been drilled and which includes a cased portion 14 and an uncased portion 16. A conventional wellhead 18 has been provided for the wellbore 12 and on which is mounted a coiled tubing injection unit, generally designated by the numeral 20 and of a type commercially available. The coiled tubing injection unit 20 is adapted to convey into and out of the wellbore 12 a suitable length of coilable metal tubing 22 which is adapted to be stored on a reel 24. The reel 24 is adapted to place the coiled tubing 22 in communication with a source of hydraulic fluid by way of a pump 26 through a conduit 28 which is operable to be in communication with the coilable tubing 22 through suitable mechanism associated with the reel 24. In like manner, electrical cable, not shown in FIG. 1, is extensible through the coiled tubing 22 and is in communication, by suitable mechanism associated with the reel 24, with a control console 30. By way of example, a reel which provides for conducting hydraulic fluid to coilable tubing and for conducting electrical signals to electrical cable extending within the tubing is described in U.S. Pat. No. 4,685,516 to Lonnie J. Smith and assigned to the assignee of the present invention.

The tubing string 22 is operable to be extended into and out of the wellbore through the injection unit 20 and have on its distal end a unique hydraulically-actuated downhole seismic source apparatus generally designated by the numeral 32. The apparatus 32 is operable to engage the wall forming the wellbore 12 for generating acoustic signals which are transmitted through the earth formation 10 to a suitable array of seismometers or geophones 34 which, by way of example, are illustrated as disposed on the earth's surface. Vibratory signals received by the array of seismometers 34 may be analyzed in accordance with known processes for determining certain characteristics of the earth formation around the wellbore 12. The seismic analysis technique of the general type described herein is sometimes known in the art as vertical seismic profiling and wherein, when the signal source is disposed in a wellbore, the process is often known as reverse vertical seismic profiling. The apparatus 32 is disposed at the distal end of the tubing string 22 and is connected thereto by a connector 36 which will be described in some detail herein and which may be generally of a type described in U.S. Pat. No. 4,787,446 to Eddie P. Howell and assigned to the assignee of the present invention.

Figure 2A:
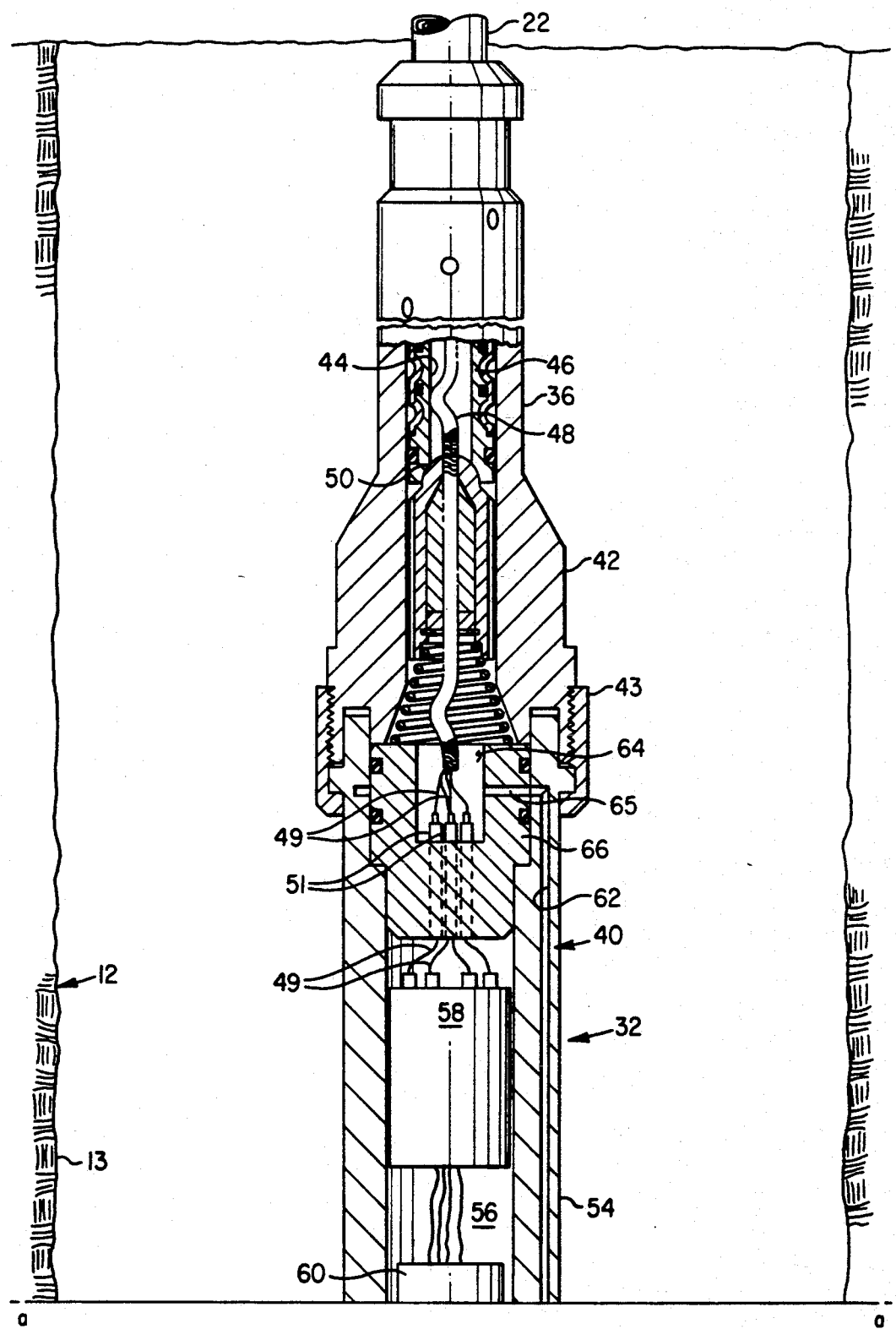
FIGS. 2A through 2D comprise a longitudinal central section view of one embodiment of the present invention.

Referring now to FIG. 2A, the apparatus 32 comprises an elongated tubular body assembly 40 which is coupled to a connector head part 42 which is adapted to be connected to the coilable tubing 22 in the same manner as described in the aforementioned patent. A central longitudinal passage 44 is formed in an adapter part 46 which is connected to the distal end of the coilable tubing 22 and through which extends a multi-conductor electric cable 48, sometimes known as a wireline. A spring-biased check valve 50 is engageable with the adapter part 46 to substantially prevent the flow of fluid up through the tubing string to the surface. The cable 48 extends through the valve 50 and plural conductors 49 forming part of the cable are connected to respective bulkhead connectors 51. The head part 42 is connected to a body part 54 comprising a generally elongated, cylindrical member having an interior cavity 56 for a suitable electrical control circuit 58 and a valve body block 60 which supports one or more electrically-operated valves which will be described in further detail herein in conjunction with the schematic diagram of FIG. 3. The body member 54 includes an elongated fluid conducting passage 62 extending therethrough and in communication with the passage 48 by way of a cavity 64 formed in a head part 66 disposed in one end of the cavity 56 and retained in assembly with the body part 54 by the head part 42. A nut 43 threadedly interconnects the body part 54 with the head part 42, as illustrated. A connecting passage 65 interconnects the passage 62 with the cavity 64.

Figure 2B:
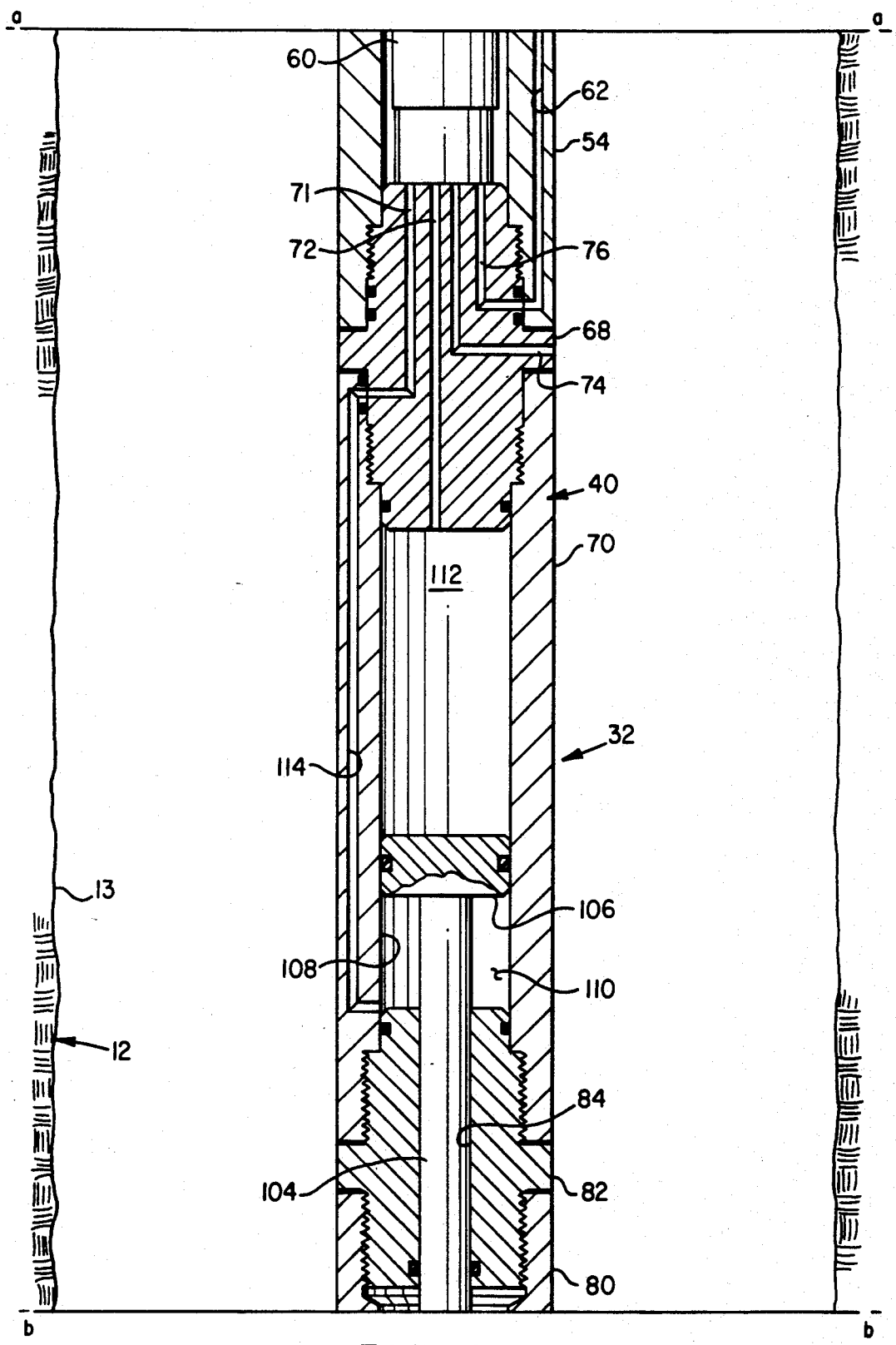

Referring also to FIG. 2B, the body part 54 is connected to a coupling member 68 which interconnects the body part 54 with a second body part 70 which is also a generally cylindrical tubular member. The body parts 54 and 70 are threadedly connected to each other by way of the coupling 68, which coupling includes plural passages 71, 72, 74 and 76 formed therein. The passage 76 is in communication with the passage 62 and comprises a fluid supply passage leading to the valve block 60.

Figure 2C:
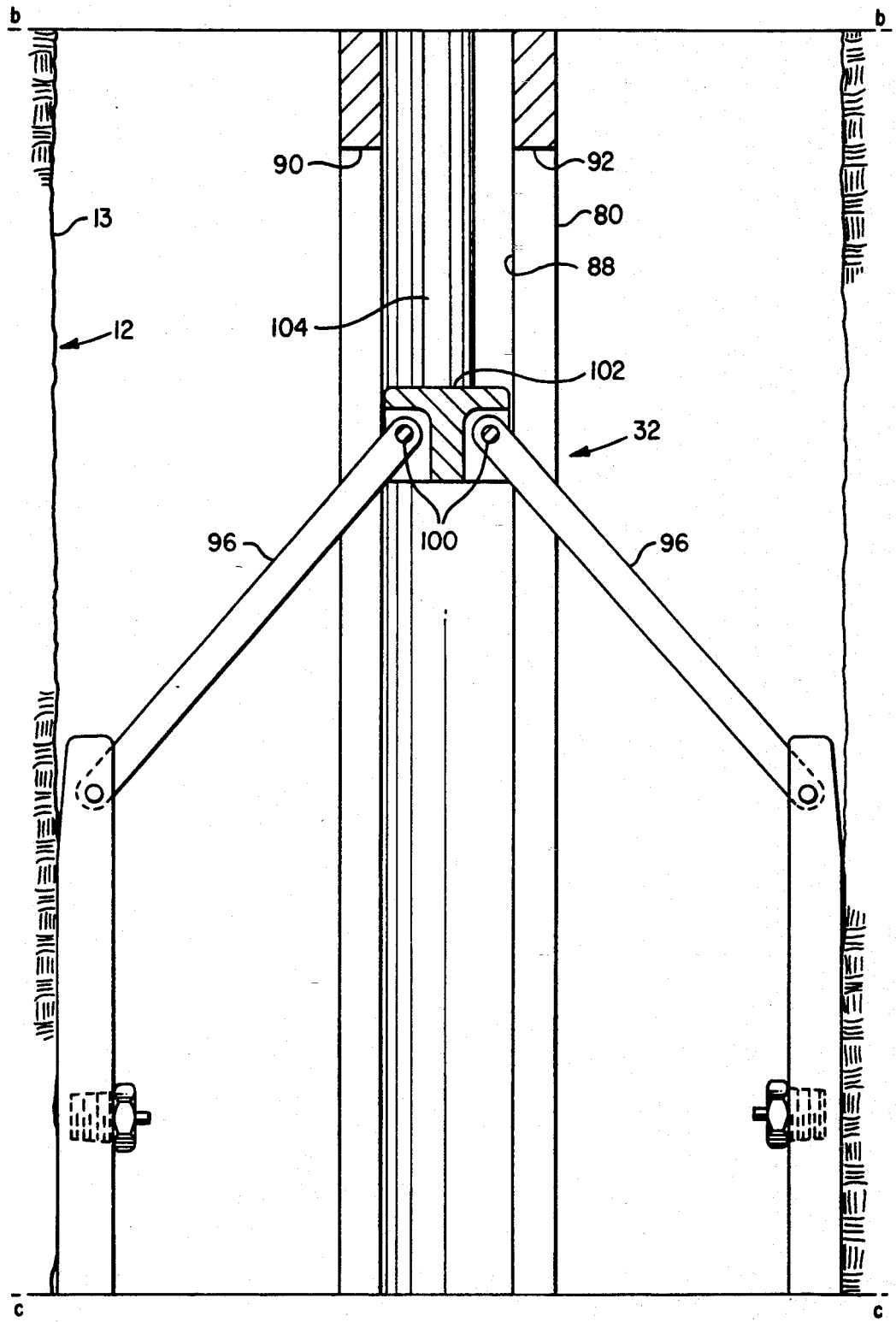
Figure 2D:
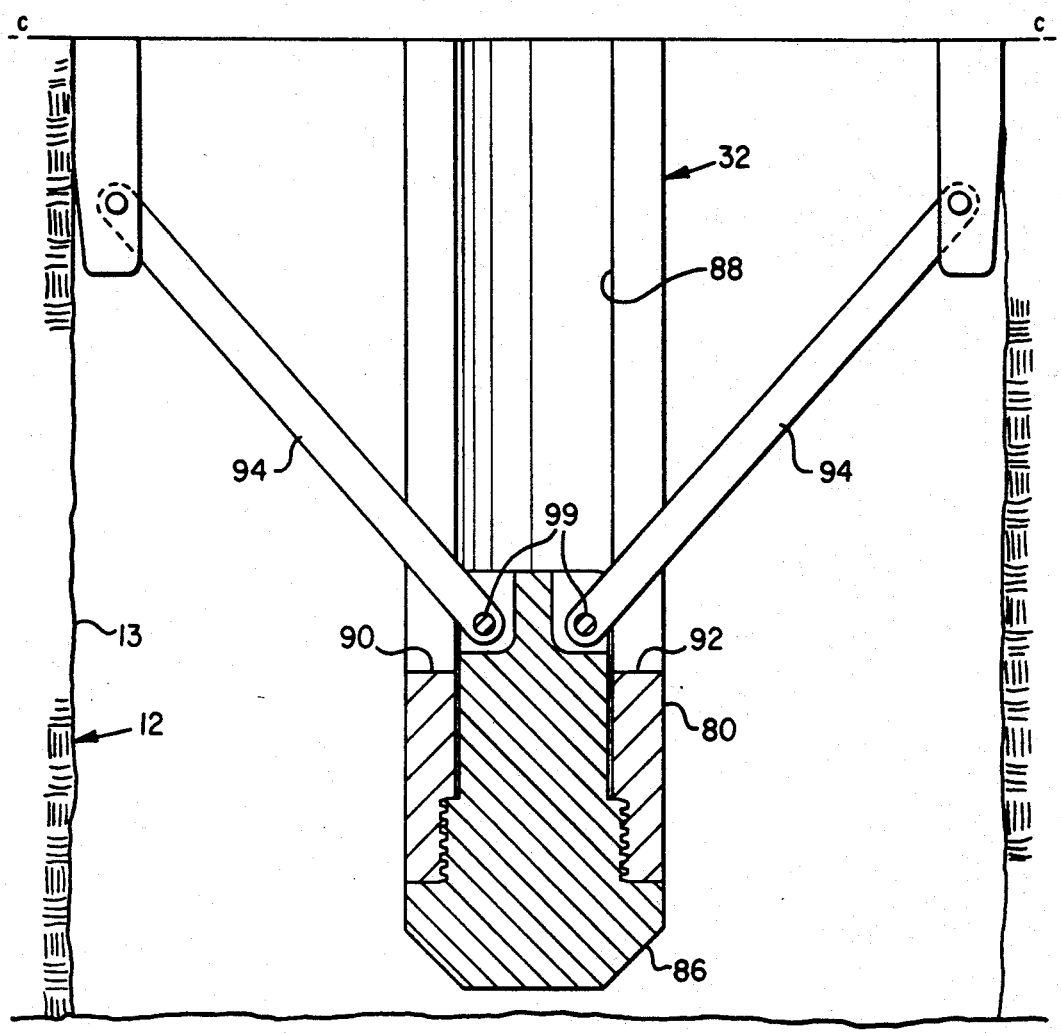

The body part 70 is connected to a third body part 80 of generally cylindrical configuration and which is coupled to the body part 70 by an intermediate coupling member 82 having a central bore 84 extending therethrough. As shown in FIGS. 2C and 2D, the third body part 80 is connected to a bottom head part 86 and includes a central axially-extending bore 88 formed therein and a pair of opposed slots 90 and 92 which provide clearance for respective sets of arms 94 and 96 which are pivotally connected to a pair of opposed borewall contacting pads 98, as illustrated. The arms 94 are also pivotally connected at their opposite ends to the bottom head part 86 at respective pivot connections 99.

The arms 96 are pivotally connected at pivot connections 100, FIG. 2C, to a slider member 102 slidably disposed in the bore 88 and journaled thereby. The slider 102 is connected to a piston rod 104 which extends through the bore 84, FIG. 2B, and is connected to a piston 106 slidably disposed in a bore 108 formed in the body part 70. The piston 106 divides the bore 108 into opposed fluid chambers 110 and 112, respectively. The chamber 112 is in communication with the passage 72 and the chamber 110 is in communication with a passage 114 which extends through the body part 70, as shown, and is in communication with the passage 71 in the coupling part 68. Accordingly, hydraulic pressure fluid may be conducted to the chambers 110 and 112, selectively, by suitable valves in the manifold block 60 in a manner to provide for extension of the pads 98 into forcible engagement with the borewall 13 of the wellbore 12, retraction of the pads 98 away from the wellbore wall for traversal of the apparatus 32 through the wellbore and in the extended and forcible engagement position of the pads generate vibratory force pulses which are transmittable through the earth formation to provide the seismic signals which are read by the array of seismometers 34.

Figure 3:
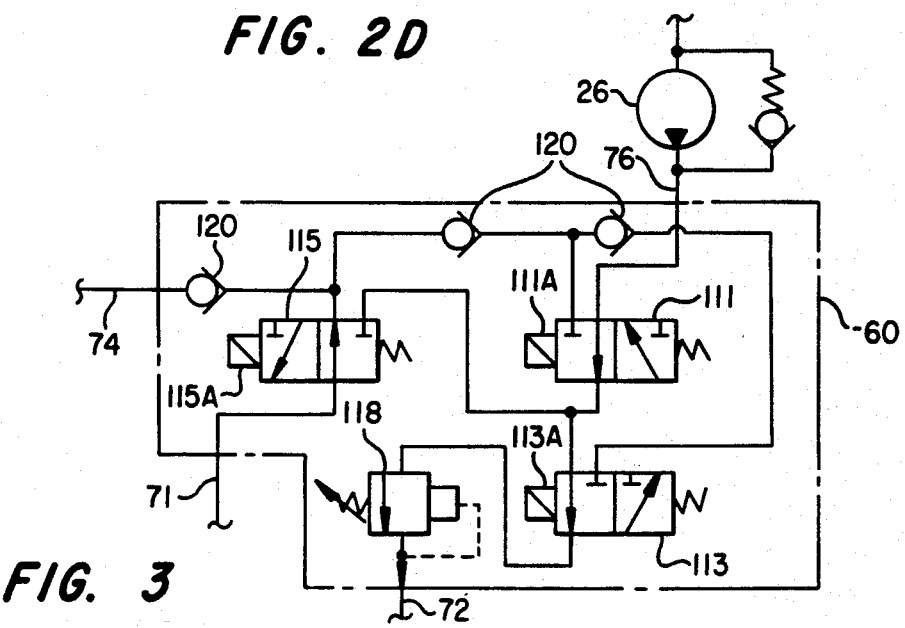
FIG. 3 is a schematic diagram of a portion of a hydraulic control system for the embodiment of FIGS. 2A through 2D.

Referring now to FIG. 3, one embodiment of a hydraulic control circuit which may be used in conjunction with the apparatus 32 is illustrated and is substantially contained within the manifold block 60 as indicated. The control circuit illustrated in FIG. 3 includes a plurality of electrically actuated valves 111, 113 and 115 which are arranged in an exemplary arrangement to effect extension of the signal-generating pads 98 to their deployed and operative position, retraction of the pads for traversal of the apparatus through the wellbore and for imparting a selected vibratory signal of variable amplitude and duration. In the control circuit illustrated in FIG. 3, the valve 111 is in communication with the supply passage 76 and the exhaust passage 74 and is operable to receive a suitable hydraulic fluid for operation of the apparatus, which fluid may be, for example, diesel fuel or a similar liquid which may be exhausted to the wellbore through the passage 74. When the valve 111 is energized by its solenoid actuator 111A, hydraulic fluid may be conducted to valves 113 and 115. When valve 113 is energized by its solenoid actuator 113A hydraulic fluid may be transmitted through a pressure regulator valve 118 to the passage 72 to bias the piston 106 to extend the pads 98 into engagement with the wellbore wall 13.

In like manner, when the valve 115 is energized by its actuator 115A, fluid may be conducted by way of the passages 71 and 114 to the chamber 110 to urge the piston 106 to retract the pads 98 away from engagement with the wellbore wall. The valves 113 and 115 are also adapted to be in communication with the exhaust passage 74 by way of circuitry including suitable check valves 120 to control direction of exhaust fluid flow. With the valves 111 and 113 in their energized positions, the piston 106 is forced by fluid entering the chamber 113 to extend the pads 98 into engagement with the wellbore wall 13. The pressure of fluid in the chamber 112 may be adjusted by the pressure regulator 118 to be a pressure typically somewhat less than the fluid supply pressure or in any case the pressure of fluid entering the chamber 110 when the valve 115 is operative to conduct pressure fluid to that chamber. Accordingly, due to the differential areas of the piston 106, a higher fluid pressure must be transmitted to the chamber 110 to effect oscillatory movement of the piston 106.

A typical operating sequence of the control circuit illustrated in FIG. 3 for operation of the apparatus 32 would be as follows. Upon deployment of the apparatus 32 into the wellbore 12 connected to the tubing string 22, which could be accomplished by insertion through a suitable lubricator arrangement in conjunction with the injection apparatus 20, the pads 98 would be in their retracted position which could be assured by placing the valve 111 in its energized position, placing the valve 113 in its de-energized position to permit flow of fluid out of chamber 112 by way of the passage 72, the valve 113 and the exhaust passage 74, and placing the valve 115 in its energized position to assure flow of pressure fluid to the chamber 110 to hold the pads retracted by displacement of the piston 106 toward the coupling part 68.

Once the apparatus 32 was deployed in the desired position in the wellbore, the valve 113 would be energized and the valve 115 de-energized to permit pressure fluid to enter the chamber 112 and urge the piston 106 toward the coupling part 82 and to extend the pads 98 into forcible engagement with the wellbore wall 13. A suitable electrical control circuit would then be brought into operation to effect periodic energization of the valve 115 to cause flow of fluid to the chamber 110 or relief of pressure of fluid in the chamber 110, depending on the position of valve 115 to effect oscillatory impact-type movement of the piston 106 which would be transmitted to the pads 98. Accordingly, a variable vibratory exciting force could be exerted on the pads 98 by suitable control of the operation of the valve 115 and/or the valve 113. The above-mentioned mode of operation is merely exemplary of one technique for effecting oscillatory movement of the piston 106 for transmitting vibratory impact-type forces for transmission by the pads 98 to the formation 10. Of course, when it is desired to move the apparatus 32 to another location in the wellbore, the valve 113 would be de-energized and the valve 115 moved to an energized position to hold the pads 98 retracted by conducting pressure fluid to the chamber 110 to move the piston 106 to retract the pads.

Referring now to FIGS. 4A through 4E, an alternate embodiment of a downhole seismic signal-generating apparatus is illustrated disposed in the wellbore 12 and generally designated by the numeral 132. The apparatus 132 is adapted to utilize the connector 36, not shown in FIG. 4A, and head 66 per the configuration of the apparatus 32. Moreover, the apparatus 132 further utilizes the cylindrical body part 54, FIG. 4A, which includes an electrical control circuit 136 and a hydraulic circuit disposed within a valve manifold block 138, which circuit will be described in further detail herein. The manifold block 138 is supported on a coupling and adapter part 140 threadedly connected to the body part 54 and to a second generally cylindrical body part 142.

Figure 4A:
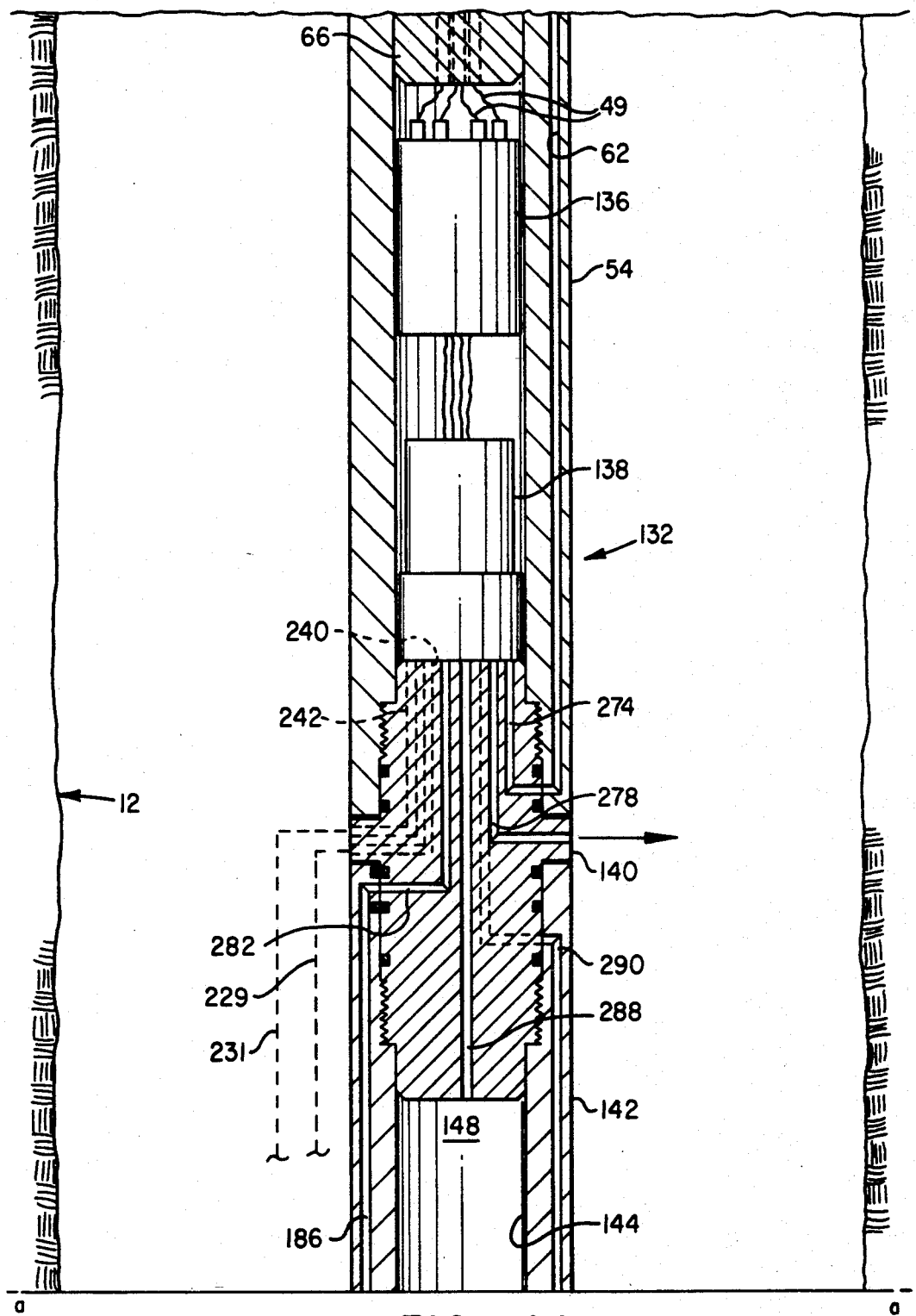
FIGS. 4A through 4E comprise a longitudinal central section view of an alternate embodiment of the present invention.
Figure 4B:
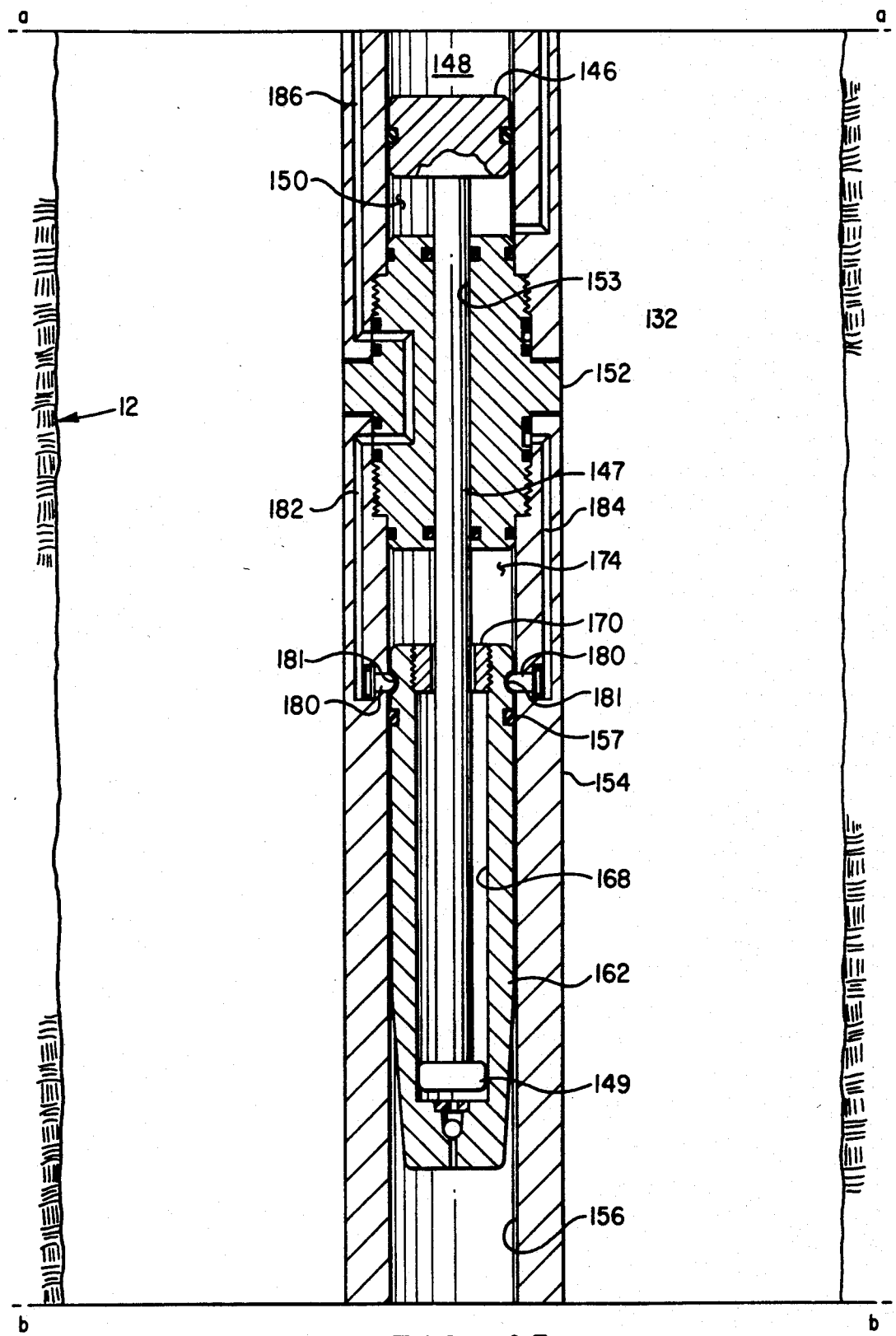

The body part 142 includes a generally cylindrical bore 144 in which is disposed a piston 146, FIG. 4B, of an impactor resetting mechanism. The piston 146 divides the bore 144 into opposed chambers 148 and 150. The chamber 150 is also defined in part by a coupling member 152 similar in some respects to the coupling member 82 of the embodiment described in FIG. 2B. The coupling 152 is also connected to a further generally cylindrical, elongated body part 154 which also includes a cylindrical bore 156 formed therein and extending longitudinally through the body part 154. The body part 154 is connected to still a further elongated, cylindrical, tubular body part 158, FIG. 4C, by a second coupling member 160 similar to the coupling member 152.

The body part 154 houses an impactor mechanism, similar in some respects to the impactor described in U.S. Pat. No. 4,284,165 to Tom P. Airhart, et al and assigned to the assignee of the present invention. The impactor mechanism includes an impactor hammer 162, FIG. 4B, slidably disposed in the bore 156 and operable to impact an anvil or striker member 164, FIG. 4C, formed as a generally cylindrical piston head slidably disposed in the bore 156. The impactor 162 has a bore 168 extending therewithin and receiving a threaded collar 170 for closing one end of the bore. The impactor 162 includes suitable seal means 157 for forming essentially a fluid tight seal with the bore 156 and defining a compressed gas chamber 174 within the bore 156 and closed by the coupling member 152.

The resetting piston 146 is connected to an elongated rod 147 which extends through a bore 153 in the coupling member 152 which is provided with suitable seal means in sealing engagement with the rod 147. A head 149 is disposed on the end of the rod 147 opposite the piston 146 and is engageable with the retainer 170 for moving the impactor 162 from an impact position in contact with the striker member 164 to the position illustrated in FIG. 4B in response to valving pressure fluid to the chamber 150 to effect upward movement, viewing FIG. 4B. The resetting mechanism characterized by the piston 146, rod 147 and head 149 assembly is shown in a parked position to permit free fluid-driven movement of the impactor 162 toward the striker head 164. A latch mechanism comprising opposed hydraulically actuated latch members 180 holds the impactor 162 in the position illustrated in response to valving pressure fluid through passages 182 and 184 from a supply passage 186 extending through the apparatus 132 from the valve manifold block 138, as illustrated. The latch pistons 180 are engageable with suitable recesses 181 formed in the impactor 162 to hold it in the position illustrated under the urging of pressure fluid acting on the latch pistons. Upon relief of fluid pressure in the passages 182 and 184, a charge of compressed gas in the chamber 174 drives the impactor 162 downwardly, viewing FIG. 4B, to impact the striker head 164. As mentioned above, the impactor 162 is reset to the position shown by movement of the reset piston 146 upwardly to draw the impactor 162 upwardly toward the coupling member 152 and recompressing the charge of gas trapped in the chamber 174. When the reset piston 146 has reset the impactor 162 to the position shown and the latch pistons 180 are energized to hold the impactor in the position shown, the reset piston 146 is returned to the position shown to provide for clearance between the head 149 and the retainer 170.

Figure 4C:
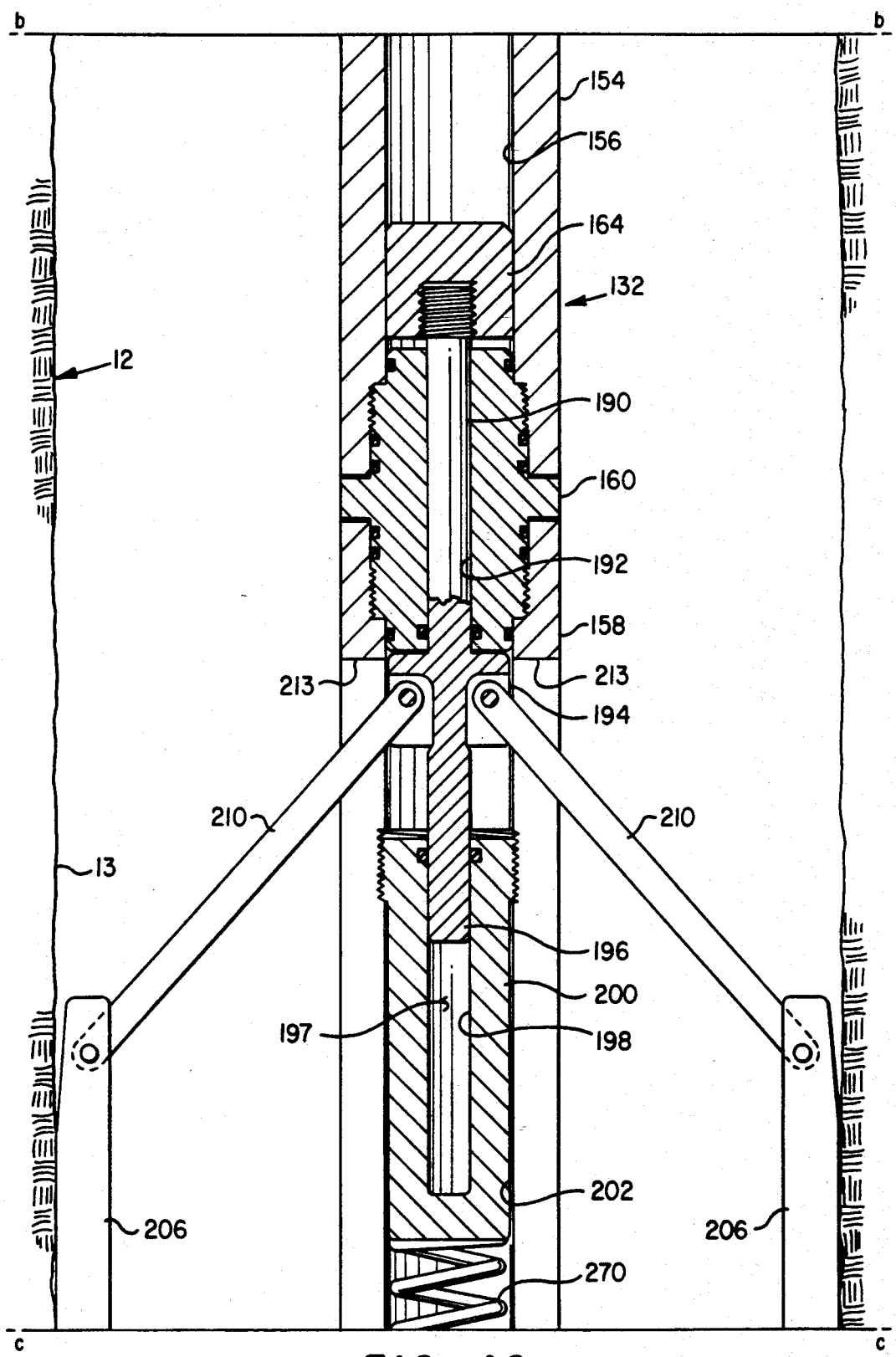
Figure 4D:
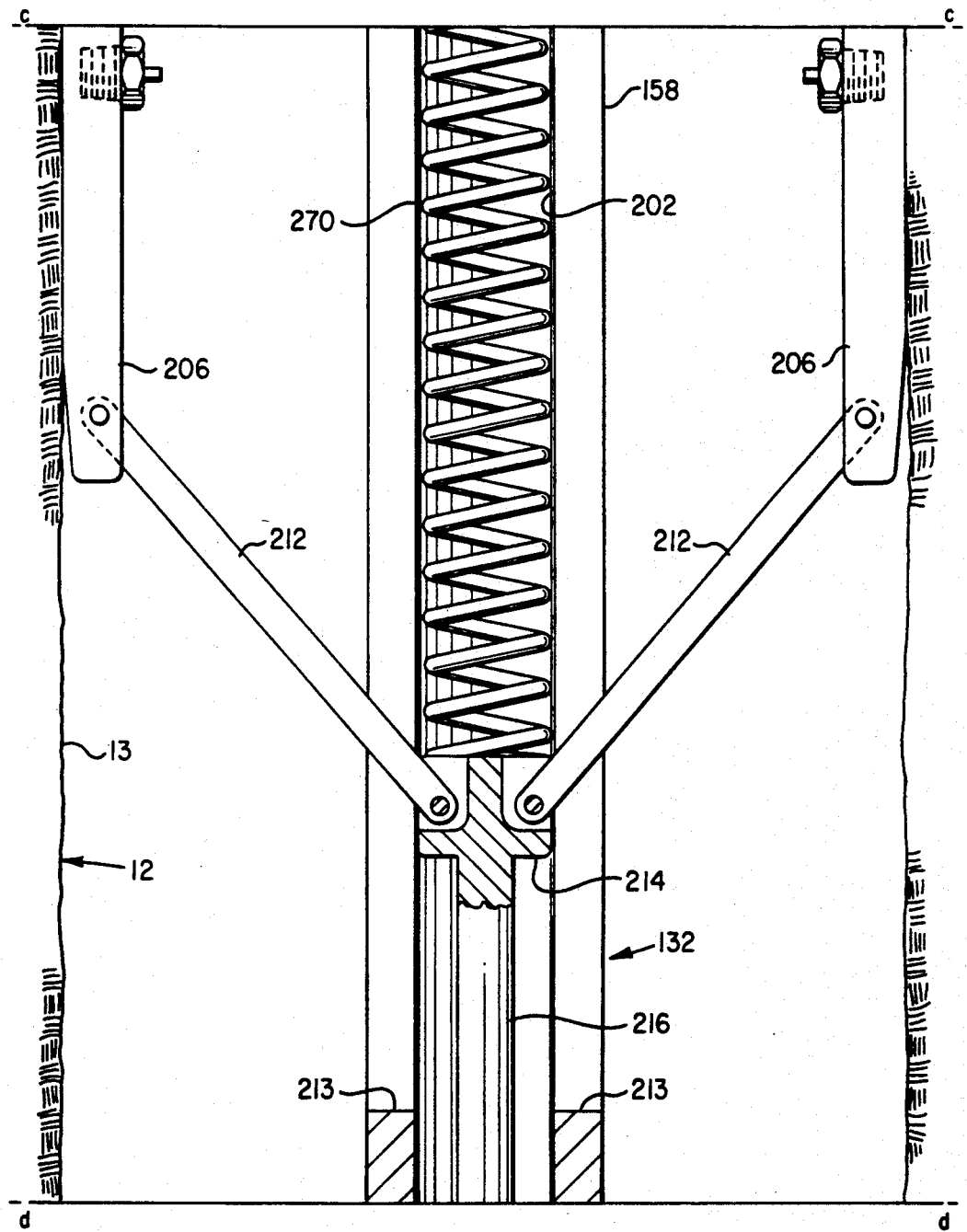

Referring further to FIGS. 4C and 4D, the striker head 164 is connected to a stem portion 190 which extends through a central longitudinal bore 192 formed in the coupling part 160. The stem portion 190 is connected to a piston head part 194 having a reduced diameter piston portion 196 slidably disposed in a bore 198 formed in a head member 200 mounted in a bore 202 formed in the body part 158. A chamber 197 is formed by the bore 198 and the piston portion 196 and is evacuated or filled with air at atmospheric pressure to provide pressure compensation means for reducing any biasing force acting in opposition to the direction of force imparted to the striker head 164 by the impactor 162. Impact blows delivered to the striker head 164 are transmitted to a pair of opposed force transmission pad members 206 which are pivotally connected to the striker head and piston assembly by extension arms 210 and 212 formed as opposed pairs. The arms 210 and 212 extend through opposed elongated slots 213 formed in the body part 158.

Figure 4E:
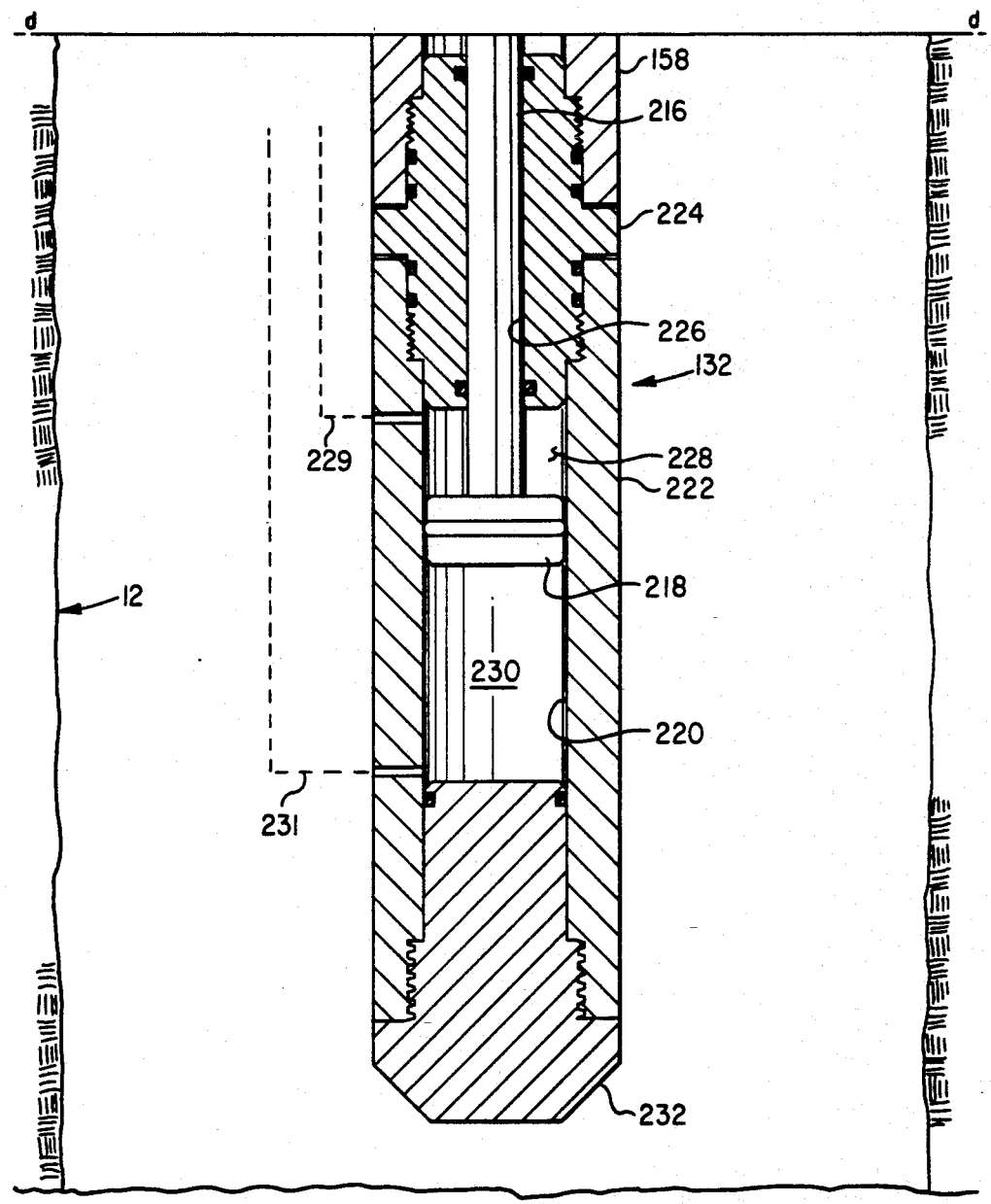

The arms 210 are pivotally connected to the striker piston head 194 and the arms 212 are pivotally connected to a pad extension and retraction mechanism including a head part 214, FIG. 4D, connected by an elongated piston rod 216 to a piston 218, FIG. 4E. The piston 218 is slidably disposed in a bore 220 formed in a fourth generally cylindrical body part 222 connected to the body part 158 by a coupling member 224 similar to the coupling member 160. The piston rod 216 extends through a bore 226 formed in the coupling part 224 and opposed pressure fluid filled chambers 228 and 230 are formed in the body part 222. The chamber 230 is closed by a suitable end part 232 removably secured to the body part 222. Pressure fluid is supplied to the chambers 228 and 230 by suitable passages 229 and 231 suitably formed in the apparatus 132 and, for clarity, shown schematically in FIGS. 4A and 4E. The passages 229 and 231 are in communication with the valve manifold block 138 by way of passages 240 and 242 formed in the adapter part 140.

The pads 206 are normally biased into their retracted position by a coil spring 270, FIGS. 4C and 4D, disposed in the bore 202 and acting on the head part 214. In the absence of pressure fluid acting on the piston 218, the spring 270 will normally act to move the head part 214 downwardly, viewing FIG. 4C to retract the pads 206 away from the borewall 13.

Figure 5:
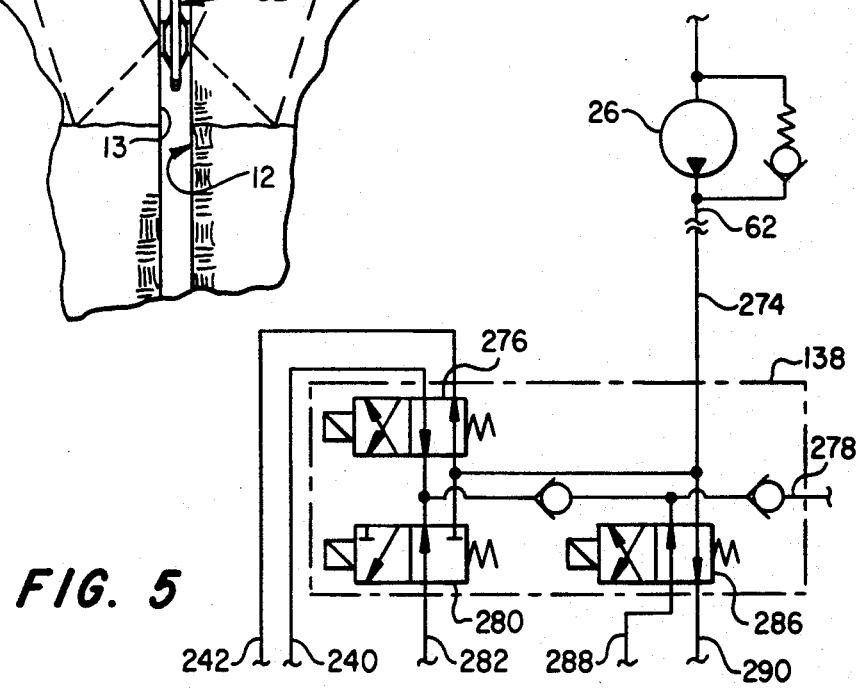
FIG. 5 is a schematic diagram of a portion of a hydraulic control system for the embodiment of FIGS. 4A through 4E.

Referring now briefly to FIG. 5, there is illustrated a schematic diagram of an exemplary control circuit including certain hydraulic valves which may be housed in the manifold block 138 for controlling the flow of hydraulic fluid to the impactor retraction mechanism, the piston hammer latching members 180 and the extension and retraction mechanism for the pads 206. In FIG. 5 the source of hydraulic fluid may be the pump 26 if the apparatus 132 is used in place of the apparatus 32 in the arrangement of FIG. 1. Pressure fluid is supplied through the tubing string 22 to the passage 62 in the body part 54 and then to a passage 274 in the coupling or adapter part 140. An electrical power operated valve 276 is operable to receive pressure fluid from the passage 274 and to vent pressure fluid to an exhaust passage 278 to the exterior of the apparatus 132. The valve 276 is also operable to supply fluid to the passages 240 and 242 for actuation of the pad extension and retraction piston 218.

A second electrically operated valve 280 is operable to supply pressure fluid to the passage 186 and to the latches 180 by way of a passage 282 in the member 140. The valve 280, when moved to the position shown, may vent pressure fluid to the exhaust passage 278. Still further, a valve 286 may be electrically operated to move from the position illustrated for valving fluid to the chambers 148 and 150 by way of passages 288 and 290. Accordingly, the electrical control circuit for the apparatus 132 may be operated to selectively control the operation of the valves 276, 280 and 286.

By way of example, the apparatus 132 may be operated to provide a seismic signal to the earth formation 10 by deploying the apparatus 132, connected to the tubing string 22, and supplying hydraulic fluid, such as diesel fuel, through said tubing string to the valve manifold block 138. The apparatus 132 would normally be lowered into a wellbore with the pads 206 in a retracted position by supplying pressure fluid to the chamber 228 to urge the piston 218 to hold the arms 210 and 212 in a position away from the wellbore wall 13. During the operation of lowering or retrieving the apparatus 132 with respect to the wellbore 12, the valves 280 and 286 may be in either working position. Once the apparatus 132 is deployed in a selected position in the wellbore, the valve 276 is shifted to provide pressure fluid to the chamber 230 while venting pressure fluid from the chamber 228 to effect radial outward extension of the pads into forcible engagement with the borewall 13. The valve 286 would then be cycled to effect movement of the reset piston 146 to move the impactor hammer 162 to the position shown in FIG. 4B and the valve 280 would be moved to a position to supply pressure fluid to the latch pistons 180 to lock the hammer in the position shown. The valve 286 would then be shifted to supply pressure fluid to the chamber 148 to move the reset piston 146 and the head 149 to the position illustrated in FIG. 4B which permits movement of the impact hammer 162 downwardly.

When desired the latch pistons 180 are relieved of pressure fluid acting thereon by shifting the valve 280 to the spring biased position shown to allow the hammer 162 to act under the urging of high-pressure gas in the chamber 174 to be driven downwardly to impact the striker head 164 and transmit an impact blow through the pad support mechanism to the pads 206 and to the earth formation in contact therewith. The impactor hammer 162 is then reset for further blow-delivering operations. When it is desired to move the apparatus 132, pressure fluid is valved to the chamber 228 and relieved from the chamber 230 to effect retraction of the pads 208 away from the wellbore wall.

As aforementioned, thanks to the provision of a sufficient supply of hydraulic fluid through the tubing 22 and with the provision of the unique apparatuses 32 and 132 of the present invention, improved downhole seismic signal-generating is provided. The apparatuses 32 and 132 may be constructed of conventional engineering materials used for downhole tools of the general type and applications similar to those described herein. Although preferred embodiments of seismic signal generating apparatus have been described herein, those skilled in the art will recognize that various substitutions and modifications may be made to the invention without departing from the scope and spirit thereof as recited in the appended claims.

What is claimed is:

1. A system for generating seismic signals in a wellbore for transmission of said signals through an earth formation into which said wellbore is formed, said system comprising:

an elongated tubing string extending within said wellbore, said tubing string being connected to a source of hydraulic pressure fluid;

apparatus connected to an end of said tubing string extending within said wellbore, said apparatus including body means, opposed pads supported by said body means and being radially extensible from said body means for engagement with the borewall of said wellbore, said pads being connected to respective pairs of opposed arms, at least one pair of said arms being connected to a head disposed on said body means, means for generating a seismic signal for transmission to said pads and into said earth formation including a piston disposed in a bore formed in said body means for axial reciprocating movement with respect to said wellbore and said pads, means interconnecting said head with said piston and valve means for valving pressure fluid act on said piston to generate forces by said piston for transmission through said head and said pads into said earth formation for generating said seismic signal.

2. The system set forth in claim 1 wherein:

said valve means includes a valve for effecting extension and retraction of said pads to and from a wellbore wall engaging position by valving pressure fluid to act on said piston.

3. The system set forth in claim 2 wherein:

said valve means includes a valve for selectively valving pressure fluid to act on said piston to generate repeated vibratory forces acting on said pads.

4. Apparatus for insertion in a wellbore and connected to an elongated pressure fluid conducting tubing string, said apparatus being operable to generate seismic signals for transmission through the earth at a selected point in said wellbore, said apparatus comprising:

an elongated body;

means for connecting said body to said tubing string;

opposed pads moveable with respect to said body for forcible engagement with the borewall of said wellbore for transmitting seismic signals to said earth formation;

arm means connected to said pads and to elongated rod means extending through and in sealing engagement with a part of said body means;

a piston disposed in a bore formed in said body means and defining opposed pressure fluid chambers in said body means operable to receive pressure fluid for effecting movement of said pads between a position in engagement with said borewall and a retracted position for movement of said apparatus through said wellbore and for effecting the generation of vibratory forces to act on said pads; and control means including valve means for selectively controlling the flow of pressure fluid to act on said piston to move said pads between said retracted position and said position in engagement with said borewall.

5. The apparatus set forth in claim 4 wherein:

said control means includes valve means for delivering pressure fluid to one of said chambers for biasing said piston means in one direction of movement and valve means for selectively valving pressure fluid to the other of said chambers to effect the imposition of vibratory forces on said piston means and said pad means.

* * * * *